United States Patent [19]

Tsujii et al.

[11] Patent Number: 4,635,202
[45] Date of Patent: Jan. 6, 1987

[54] NAVIGATION APPARATUS FOR AUTOMOBILE

[75] Inventors: Fumio Tsujii; Yoji Matsuoka, both of Mito; Akira Endo, Mito; Jiro Takezaki; Hiroshi Shirai, both of Katsuta, all of Japan

[73] Assignee: Hitachi, Ltd., Tokyo, Japan

[21] Appl. No.: 632,068

[22] Filed: Jul. 18, 1984

[30] Foreign Application Priority Data

Jul. 20, 1983 [JP] Japan ................... 58-131015

[51] Int. Cl.$^4$ ............................................. G06F 15/50
[52] U.S. Cl. ................................. 364/449; 364/521;
340/995
[58] Field of Search ............... 364/424, 443, 444, 449,
364/521, 565; 343/450–453; 340/988–990, 995;
73/178 R

[56] References Cited

U.S. PATENT DOCUMENTS 4,504,913  3/1985  Miura et al. .......................... 364/449
4,511,973  4/1985  Miura et al. .......................... 364/521
4,513,377  4/1985  Hasebe et al. ....................... 364/521
4,532,514  7/1985  Hatano et al. ....................... 364/424

Primary Examiner—Gary Chin
Attorney, Agent, or Firm—Antonelli, Terry & Wands

[57] ABSTRACT

In a navigation apparatus for automobile having a distance-travel detection sensor for detecting the distance traveled by a vehicle a direction detection sensor for detecting the direction of travel of the vehicle, data memory for holding map data and etc., a micro processing unit for calculating the present position of the vehicle from the signals of the distance-traveled detection sensor and the direction detection sensor and for outputting display signals for the present position of the vehicle and display signals for map data read out from the data memory to correspond to the present position of the vehicle and display means for display the display signals thereon, wherein the point, at which an update of the map data corresponding to the movement of the vehicle starts, is variable in accordance with the speed of the vehicle.

4 Claims, 6 Drawing Figures

NAVIGATION APPARATUS FOR AUTOMOBILE

BACKGROUND OF THE INVENTION

The present invention relates to a navigation apparatus for an automobile which displays the present position of a vehicle on a road map together with data necessary while driving, to visually observe one's position on a map.

A navigation apparatus which detects the present position of a vehicle and displays it on a road map, and data necessary for driving is known from Japanese Patent Laid-Open No. 206817/1982 entitled "Automobile Navigator", for example. This prior-art apparatus has the following construction. Map data for the display of a road map of a specific zone and map data for a plurality of zones adjacent to that specific zone are stored in a memory means, and when the present position of the vehicle calculated on the basis of signals from a distance detection means and a direction detection means is judged to have reached a predetermined adjacent zone, the map data corresponding to that adjacent zone is read out from the memory means so that the road map corresponding to the map data is updated and displayed on a display means, so that a display of the road map of the specific zone can be automatically changed over to a display of the road map of the adjacent zone corresponding to the present position of the vehicle.

However, since the display means (for example, CRT) of the navigator must be installed within the vehicle, it must be rather small (for example, 6 inches: 9 cm long and 12 cm wide), and a map at a scale of 1/100,000 must be displayed on the CRT. If the vehicle travels at 60 km/hr, the present position of the vehicle on the CRT moves at a rate of 1 cm/min. This means that it takes between about 9 to 12 minutes for the present position to move from one end to the other end of the surface of the CRT. The map data is updated by judging that the present position based on the movement of the vehicle has reached a predetermined adjacent zone, and then reading out map data corresponding to that adjacent zone from the memory means. About one minute is needed for reading the map data out of the memory means and, in addition, a tape must be searched for the position of the map data corresponding to that adjacent zone before the map data can be read. If the time required for completing the update of the map data after the arrival of the present position at the predetermined adjacent position is between about 2 to 4 minutes in this way, the period during which the present position is displayed on the screen surface comes to be shorter when the vehicle is traveling at high speed, so that the update speed of the map data is delayed or slow when the usage time of the map data is short, etc., and a sufficient navigation function can not be exhibited because the display shifts to the next picture without displaying the present position on the screen surface adequately.

SUMMARY OF THE INVENTION

In order to eliminate such problem mentioned above in the prior art, the object of the present invention is to provide a navigation apparatus which can exhibit a sufficient navigation function while updating a map smoothly, that is, in a manner which accurately corresponds to the present position of the vehicle.

The object of the present invention mentioned above can be accomplished by varying the start point of an update of a map, when a map is updated in a navigation apparatus.

DETAILED DESCRIPTION OF PREFERRED EMBODIMENT

Hereinafter, one embodiment of the invention will be described with reference to the accompanying drawings.

Figure 1:
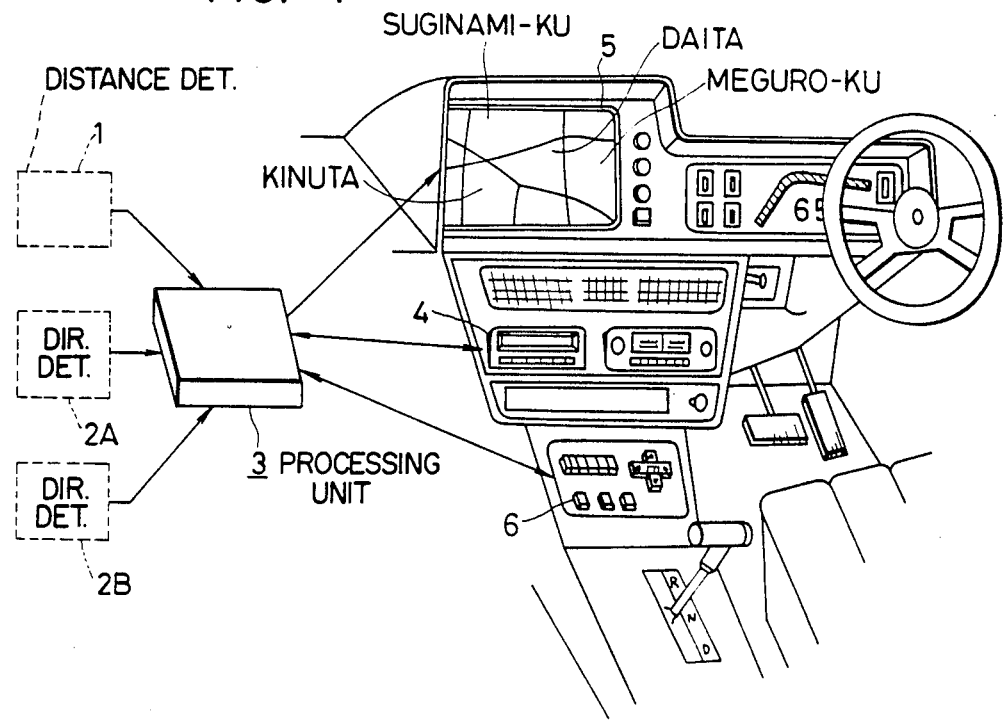
FIG. 1 illustrates the overall structure of the navigation apparatus according to the present invention.

FIG. 1 is a block diagram of the overall construction of a navigation apparatus in accordance with the present invention. In the drawing, a distance-traveled detector 1 detects the rotation of a permanent magnet attached, for example to a shaft, which rotates in an interlocking arrangement with a crank shaft of the engine, by a pickup coil, and generates a pulse signal in accordance with the vehicle speed. A first direction detector 2A detects the direction of travel of the vehicle, and could be a magnetic sensor, for example, which detects the direction of travel by utilizing terrestrial magnetism. The sensor uses what is called a "flux gate system", and determines the absolute direction from a ratio of voltages $V_x$ and $V_y$ generated in coils wound so as to cross each other perpendicularly. A second direction detector 2B detects the relative direction from the direction of travel of the vehicle.

Detection signals from the driving distance detector 1 and the direction detectors 2A, 2B are read into a signal calculation processing unit 3. The signal calculation processing unit 3 operates on these output signals to obtain an accurate present position of the vehicle, and inputs map data corresponding to the present position from a data memory device 4. A cassette tape recorder is used as the data memory device 4. The signal calculation processing unit 3 compares the present position with the data from the data memory device 4, and then the road map, the accurate present position of the vehicle on the road map, and other road data is superimposed on a display 5 consisting of a cathode ray tube (CRT). The signal calculation processing unit 3 also has the function of controlling the operation of the navigation apparatus as a whole. A keyboard 6 is used to input instructions such as various driving conditions while the vehicle is being driven, the present position, the destination, correction of the present position, etc., to the calculation processing unit 3.

Figure 2:
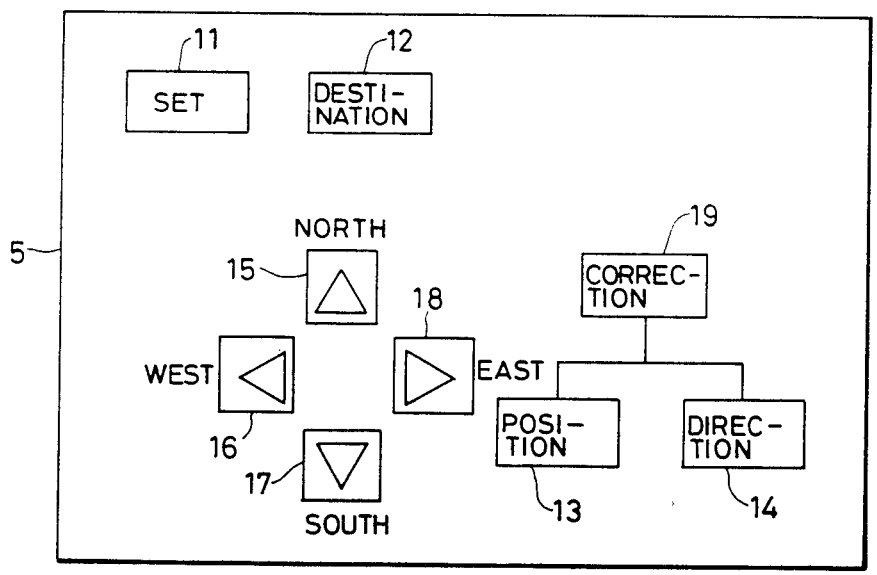
FIG. 2 illustrates the keyboard of FIG. 1 in more detail.

A concrete example of the keyboard 6 shown in FIG. 1 will now be described with reference to FIG. 2. A "set" switch 11 is used when the driving start point or destination is set during the initial setting of the navigation apparatus. A "destination" switch 12 is used in combination with the "set" switch 12 when setting the destination. A "correction" switch 19 is used to correct the present position of the vehicle and any output error of the direction detectors. It is used in combination with a "position" switch 13 when correcting the present position, and in combination with a "direction" switch 14 when correcting the output of the direction detectors 2A, 2B.

Cursor-movement switches 15–18 are used to set and move a cursor indicating the present position of the vehicle displayed on the display means 5, the cursor moves in the directions indicated by each switch. When the cursor-moving switch 15 is pressed, for example, the cursor moves upward on the CRT (to the north on the map), and when the cursor-moving switch 16 is pressed, the cursor moves leftwards (to the west on the map). In this manner, the cursor can be set to any desired position on the CRT.

Figure 3:
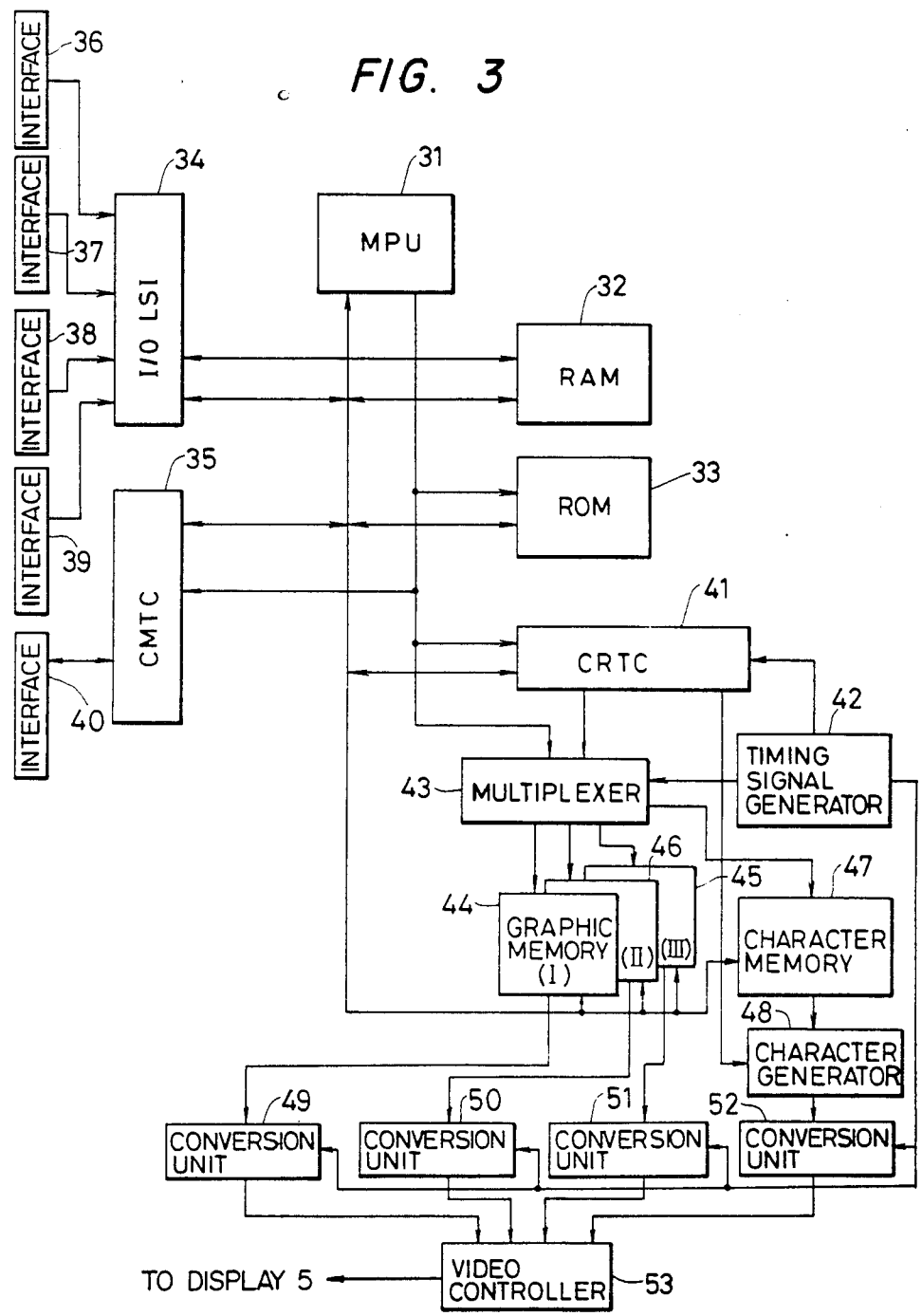
FIG. 3 is a block diagram of the circuit structure of the signal calculation processing unit of FIG. 1.

The signal calculation processing unit 3 of FIG. 1 will be described in detail with reference to the block diagram of FIG. 3. A microprocessing unit (MPU) 31 constitutes the core of the signal calculation processing unit 3 and controls the operation of the processing unit 3. A random access memory (RAM) 32 is used for temporarily storing data during the calculation and control operations of the MPU 31. The power source connected to the RAM 32 is a separate system from the system power source, and always receives power from the vehicle's battery even when the system power source is turned off, in order to preserve the memory contents. A read only memory (ROM) 33 holds programs for the various control operations and calculation processing operations of the MPU 31. Interfaces 36–39 convert the levels of external signals and shape waveforms. The distance-traveled detector 1 is connected to the interface 36, the direction detectors 2A and 2B are connected to the interfaces 37 and 38, respectively, and the keyboard 6 is connected to the interface 39. An input-output control LSI 34 outputs various data inputs thereto from the interfaces 36–39 to MPU 31. An LSI (CMTC) 35 for controlling the data memory device controls the input and output of control signals and data (road map data, various driving conditions, etc) between the data memory device 4 (a cassette tape recorder in this embodiment) and the MPU 31.

An interface 40 processes signals in order to ensure the input and output between the CMTC 35 and the data memory device 4. A CRT controller 41 is an LSI constituting the core of a circuit transmitting various display data to the display 5, and all controls of the display picture are done by this CRT controller. A timing signal generation unit 42 generates reference clock signals for the CRT controller, series clock signals transmitted to a video controller 53, and timing signals for controlling the opening and closing of gates of a multiplexer 43. The multiplexer 43 changes over an address signal of the MPU 31 and an address signal of the CRT controller using the timing signals from the timing signal generation unit 42.

Graphic memories 44–46 are memories corresponding to red, blue, and green display data of the display 5 and can read and write to and from both the MPU 31 and the CRT controller 41 through the multiplexer 43. A display of data in eight different colors is possible from combinations of these three primary colors. A character memory 47 is used exclusively for characters and displays character data on the display 7. It can read and write to and from both MPU 31 and CRT controller 41 through the multiplexer 43. A character generator 48 converts character data such as alphanumerics, symbols, katakana (Japanese alphanumerics), kanji (Chinese characters), etc., into patterns and stores them.

Character patterns are selected and output according to the output of the CRT controller 41 or the character memory 47.

Conversion units 49–52 convert the parallel data (parallel signals) output from the graphic memories 44–46 and the character generator 48 into serial data (series signals) in synchronism with the timing signals from the timing signal generator 42. A video controller 53 converts the levels and shapes the waveforms of the outputs from the conversion units 49–52 to match the requirements of the display 5, and this data is transferred to the display 5.

The operation of the present invention will now be described with reference to the drawings.

Figure 4:
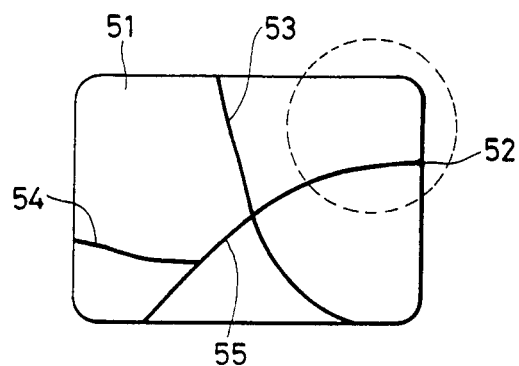
FIG. 4 illustrates one example of a display screen.
Figure 5:
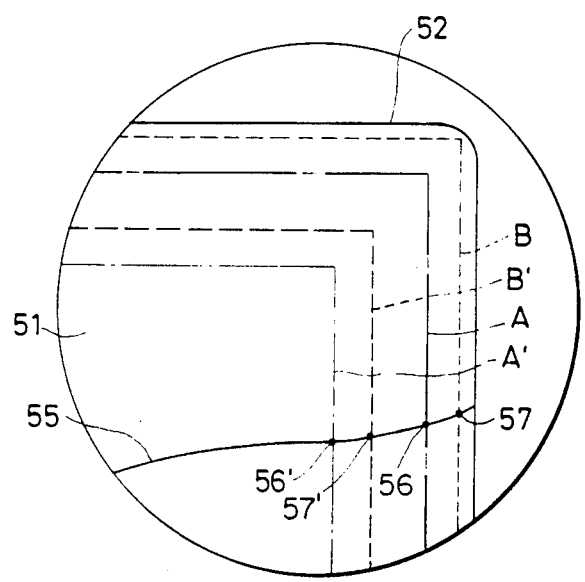
FIG. 5 illustrates the principle applied in the navigation apparatus according to the present invention.

FIG. 4 shows an example of the display screen. Roads 53–55 are displayed on the display screen 51, the road 55 disappears off the screen at a display edge 52. FIG. 5 is an enlarged view of the dotted portion of FIG. 4, explaining the present invention. Heading boundary lines A, A' are boundary lines which start to head the map data to be displayed next, while read boundary lines B, B' are boundary lines at which the reading of the headed map data from the data memory device 4 is started. Intersection points 56, 56', 57, 57' are intersection points between the boundary lines A, A', B, B' and the road 55. The heading boundary line A' and the read boundary line B' are boundary lines used when the vehicle speed is above 120 km/hr, while the heading boundary line A and the read boundary line B are those used when the speed is below 30 km/hr.

The display screen is made up of 256 dots in the horizontal direction and 192 dots in the vertical direction. The heading boundary line A' is positioned at the 24th dot from the effective display edge in both the horizontal and vertical directions, and the heading boundary line A is positioned at the 14th dot. Similarly, the read boundary line B' is positioned at the 18th dot, and the read boundary line B, at the 8th dot. Each of the boundary lines moves at a rate of one dot per 10 km/hr. In other words, the movement of the boundary lines changes in accordance with the vehicle speed, as tabulated below.

TABLE 1

| Vehicle speed (kg/h) | Number of dots from effective display edge | |
|---|---|---|
| | Read boundary line | Heading boundary line |
| –30 | 8 | 14 |
| 30–40 | 9 | 15 |
| 40–50 | 10 | 16 |
| 50–60 | 11 | 17 |
| 60–70 | 12 | 18 |
| 70–80 | 13 | 19 |
| 80–90 | 14 | 20 |
| 90–100 | 15 | 21 |
| 100–110 | 16 | 22 |
| 110–120 | 17 | 23 |
| 120– | 18 | 24 |

Since the heading and read boundary lines change according to the car speed, as described above, the map data can be smoothly updated without any delay.

Figure 6:
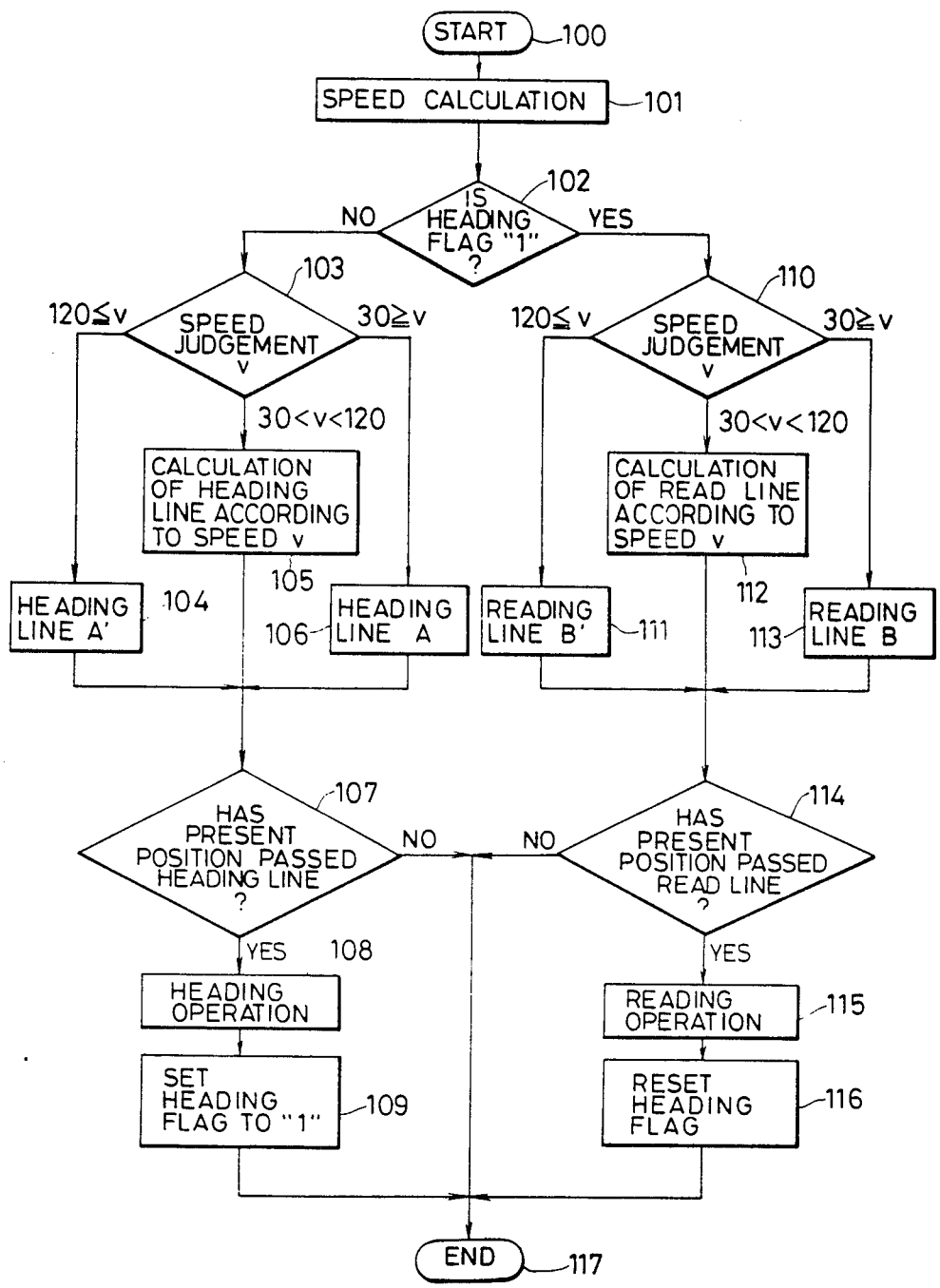
FIG. 6 is a flow chart of the operation of the navigation apparatus according to the present invention.

The operation of the present invention will now be described with reference to the flow chart of FIG. 6.

First of all, step 100 is the start of the processing of the present invention, and the start of step 100 is effected for each output of a vehicle speed pulse from the distance-traveled detector 1, or at a rate of once every few pulses. The input-output controller LSI 34 controls the timing in accordance with the signals from the MPU 31. The timing signals generated from the input-output control LSI 34 are input to an interruption signal line of the MPU 31 through an output line. Next, in step 101, the MPU 31 calculates the vehicle speed from the period of the timing signals input to the MPU 31 from the input-output control LSI 34 over an interruption signal line.

In step 102, a judgement is made as to whether or not heading is required, and this heading is executed depending upon whether or not the present position on the screen of the display device 5 has reached the heading boundary line at which the heading operation of the data memory device is started. This judgement is made by determining the presence of a flag at a specific address in the RAM 32 by means of the MPU 31. If the heading operation is not done in step 102, the flag in the RAM 32 is "O", so that the operation shifts to the next step 103.

In step 103, the following three judgements are made, that is, whether or not the vehicle speed calculated from the vehicle speed pulses from the driving distance detector 1 is above 120 km/hr, between 30 km/hr and 120 km/hr and below 30 km/hr. If the vehicle speed v is judged to be above 120 km/hr, the operation shifts to step 104, where an address is given to the heading boundary line A', followed by the next step 107.

If the vehicle speed v is judged to be between 30 km/hr and 120 km/hr in step 103, the operation shifts to step 105, a heading boundary line in accordance with the vehicle speed is calculated, and an address is given to the heading boundary line thus calculated. In other words, the heading boundary line is decided by comparing boundary lines determined at a rate of one dot per 10 km/hr of the vehicle speed, with the vehicle speed as shown in FIG. 6, an address is given to the heading boundary line, followed thereafter by the next step 107. If the vehicle speed v is judged to be below 30 km/hr in step 103, the operation shifts to step 106, an address is given to the heading boundary line A, and the operation shifts to the next step 107.

In step 107, the address of the heading boundary line given by the relevant step 104, 105, 106 (corresponding to addresses of the graphic memory 44) is compared by the MPU 31 with the address of the present position of the vehicle, and a judgement is made as to whether the address of the present position has reached or passed the address of the heading boundary line. When the address of the present position has not reached or passed the address of the heading boundary line (NO), the operation shifts to step 117, and the series of steps is completed. The operation returns to step 100, and the series of steps is repeated until a heading operation is executed.

When the judgement reached in step 107 is YES (that is, when the address of the present position has reached or passed the address of the heading boundary line), the operation shifts to step 108. An instruction of the MPU 31 is transmitted to the data memory device 4 through the CMCT 35 and the interface 40, and a heading operation of the map data unit designated by MPU 31 is executed. When this heading operation is started, the operation shifts to step 109, and a flag "1" for the heading execution is set in the specific address of the RAM 32. The operation shifts to step 117, and the series of steps is completed. The operation then returns to step 100. In step 102 through steps 100 and 101, the heading flag is "1", so that the operation shifts thereafter to step 110, and a reading operation is executed.

The description of this reading operation is omitted because it is exactly the same as the processing of the heading operation described above. The only difference is that in step 109 of the heading operation, the heading flag tested in step 102 after the start of the heading operation is set to "1", but in step 116 of the reading operation, the heading flag is reset. Accordingly, a heading operation is processed by the judgement of step 102 after the reading operation is completed. In this case, rewriting of the map data is effected during the reading in step 115. This is done by a read instruction of the headed map data unit sent to the data memory device 4 through the CMTC 35 and the interface 40, and the transfer of the corresponding map data is written into the graphic memory 44 through the interface 40 and the CMTC 35. The map data thus written into the graphic memory 44 is transmitted to and displayed by the display 5 through the video controller 53, at the timing set by the timing signal generator 42 in the conversion unit 49.

As described above, in accordance with this embodiment, the map data can be updated reliably and with good timing, even if the vehicle passes at a speed below that predetermined for a heading boundary line, because the positional relationship of the boundary line in accordance with the vehicle speed and the present position is compared.

In accordance with the present invention mentioned above, the timing at which updating of display map data is started changes in accordance with the vehicle speed, so that the display map relative to the present position of the vehicle can be updated correctly without any delay, and the driver can always receive correct and appropriate data.

What is claimed is:

1. A navigation apparatus including: distance-traveled detection means for detecting the distance traveled by a vehicle; direction detection means for detecting the direction of travel of said vehicle; data memory means for holding map data; signal calculation processing means for calculating the present position of said vehicle from signals received from said distance-traveled detection means and said direction detection means, and for outputting display signals for said present position and display signals for map data read out from said data memory means corresponding to a map area including said present position; and display means for displaying said display signals; said signal calculation processing means including means for updating said map data to a different map area according to the movement of the vehicle as indicated by the calculated present position of the vehicle when the position of the vehicle is heading into said different map area, and means for initiating operation of said updating means when the present position of the vehicle reaches a point which is spaced from the boundary of said map area by an amount determined by the speed of said vehicle.

2. The navigation apparatus as defined in claim 1 wherein the point at which said update of said map data by said updating means starts is judged by said initiating means from boundary lines defined by display signals generated by said signal calculation processing means and displayed on said display means, said boundary lines forming a locus of points spaced from the boundary of the map area by an amount determined by the speed of the vehicle.

3. The navigation apparatus as defined in claim 2 wherein said boundary lines displayed on said display means include a boundary line for starting a search in said data memory means for map data of the different map area to be displayed next, and a boundary line for starting an update of the display signals of said map data of the different map area to be displayed next.

4. The navigation apparatus as defined in claim 1 wherein said initiating means comprises means for judging a positional relationship between the present position of said vehicle and a boundary line which is positioned with respect to the boundary of the map area according to the speed of said vehicle.

* * * * *